Aug. 18, 1964  E. G. HEMSTREET  3,145,059
SPOKE TYPE WHEEL COVER
Filed Aug. 16, 1962  4 Sheets—Sheet 1
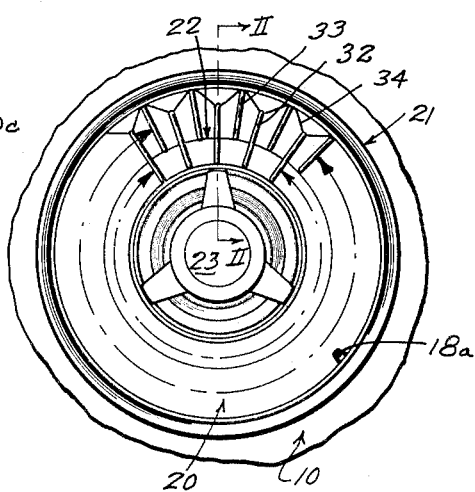
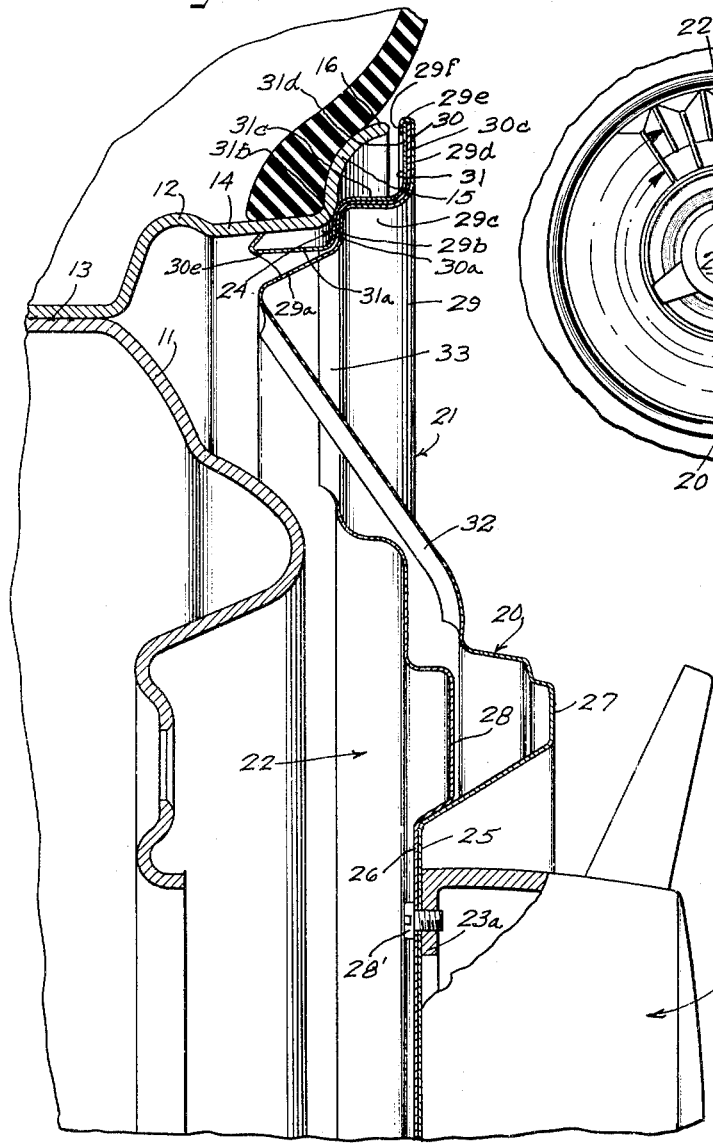
INVENTOR.
Edward G. Hemstreet
BY
ATTORNEYS Aug. 18, 1964    E. G. HEMSTREET    3,145,059
SPOKE TYPE WHEEL COVER
Filed Aug. 16, 1962    4 Sheets-Sheet 2
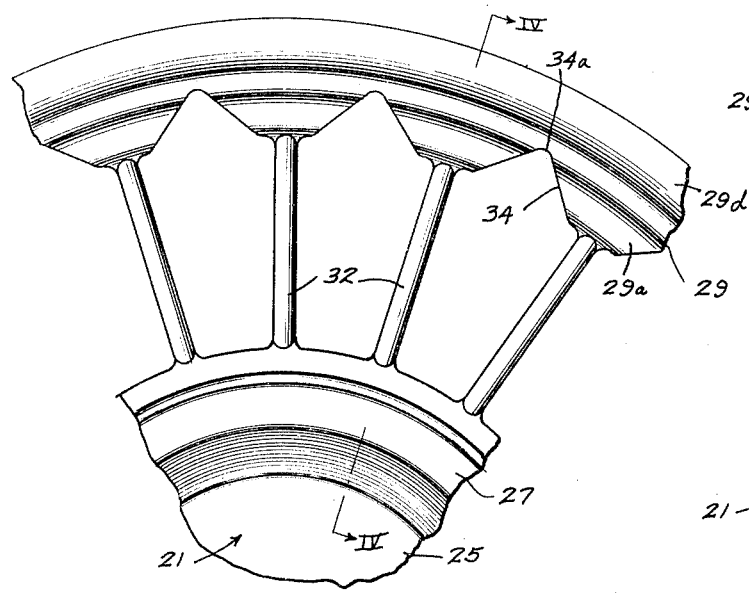
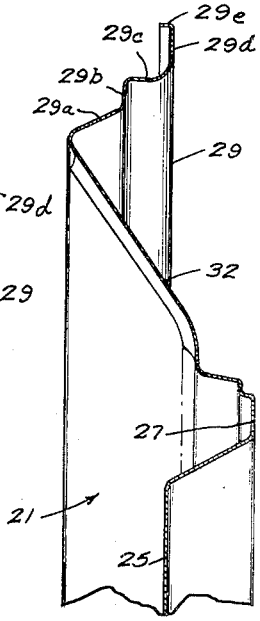
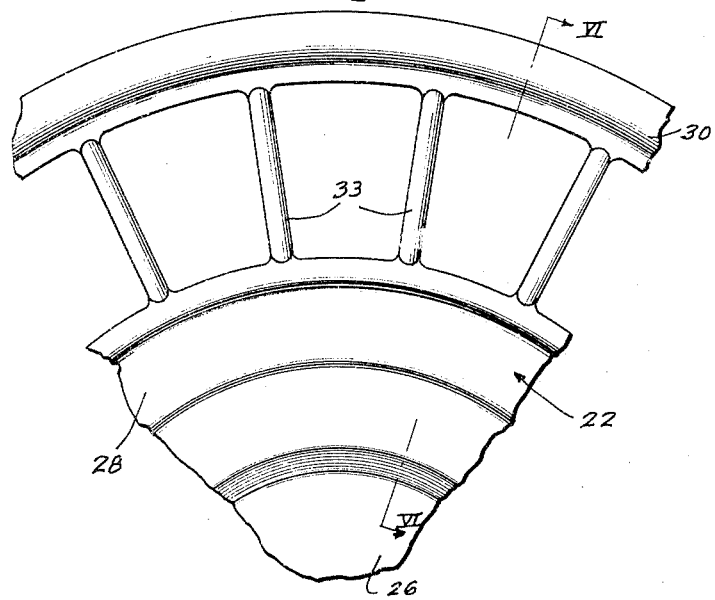
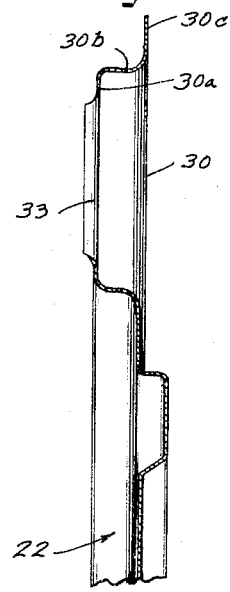
INVENTOR.
Edward G. Hemstreet
BY
ATTORNEYS

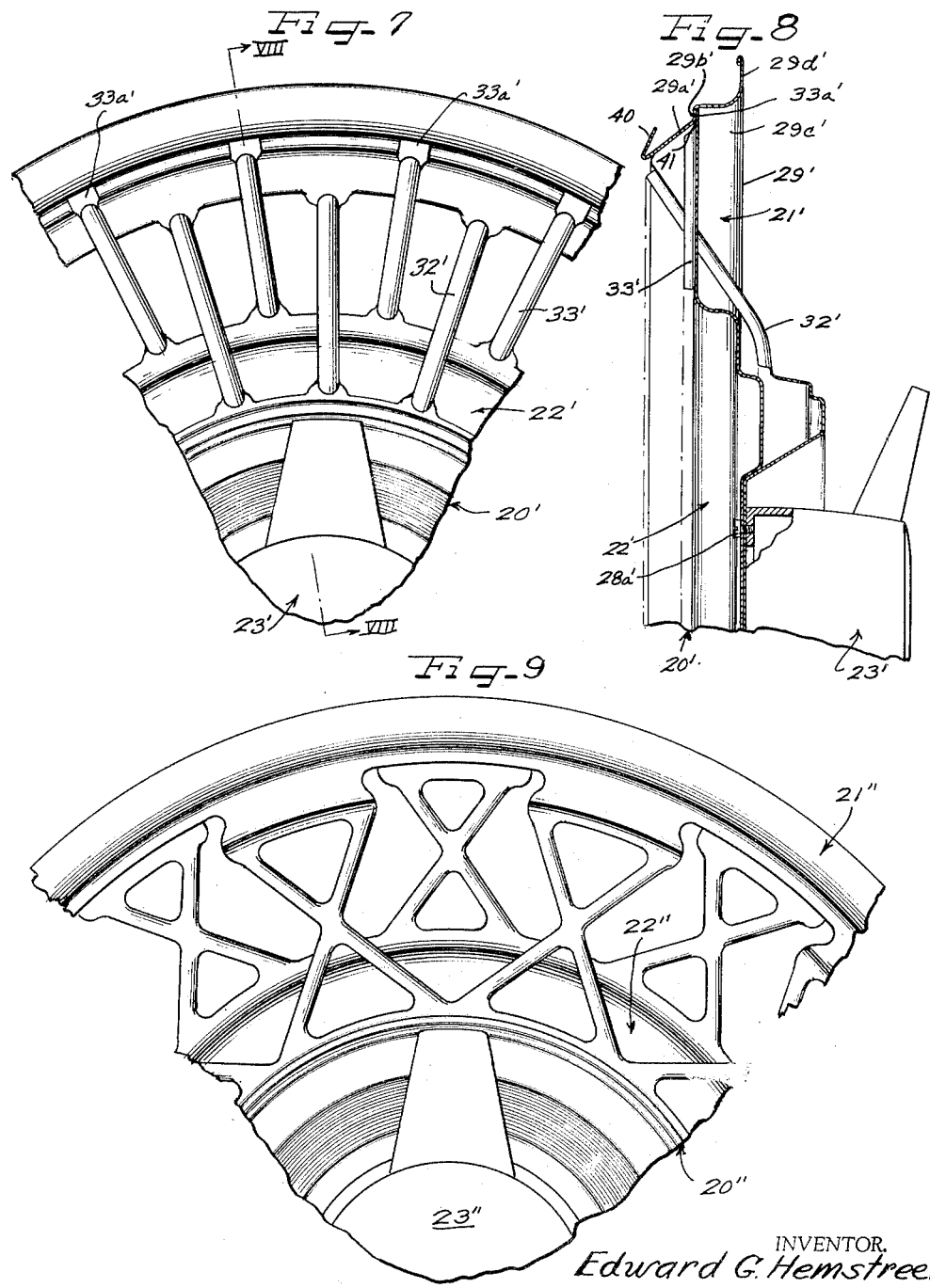

Aug. 18, 1964     E. G. HEMSTREET     3,145,059
SPOKE TYPE WHEEL COVER
Filed Aug. 16, 1962     4 Sheets-Sheet 4
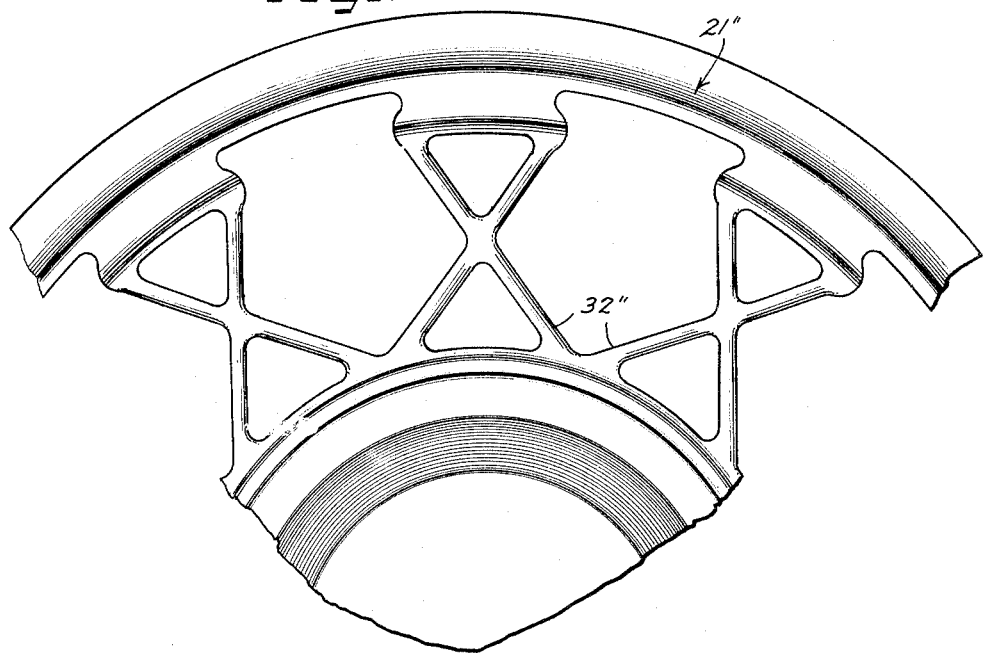
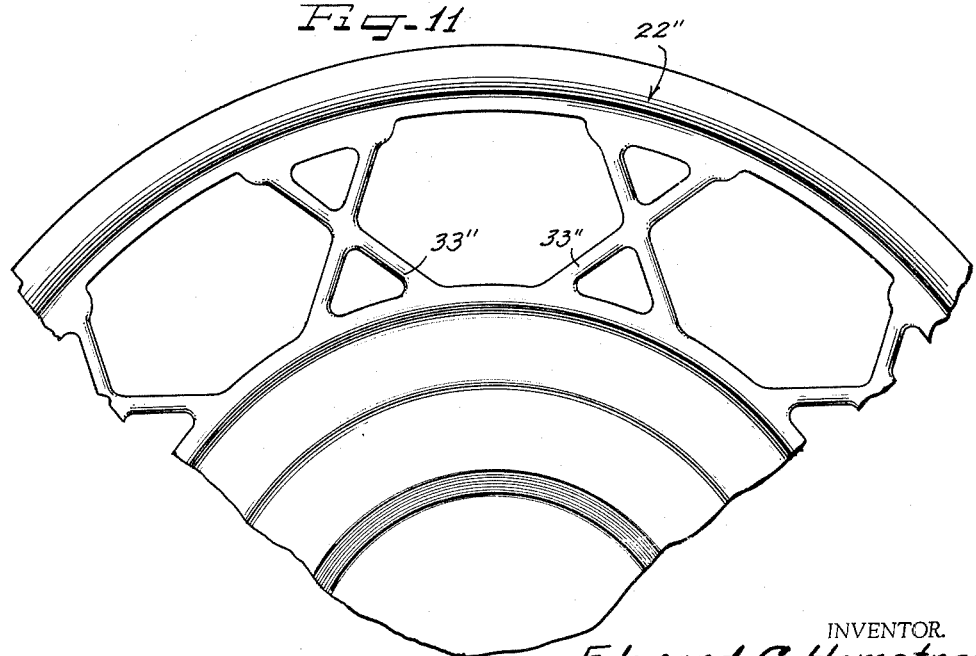
INVENTOR.
Edward G. Hemstreet
BY
ATTORNEYS United States Patent Office 3,145,059
Patented Aug. 18, 1964

3,145,059
SPOKE TYPE WHEEL COVER
Edward G. Hemstreet, Southfield, Mich., assignor to Lyon Incorporated, Detroit, Mich., a corporation of Delaware
Filed Aug. 16, 1962, Ser. No. 217,454
6 Claims. (Cl. 301—37)

The present invention relates to wheel structures and more particularly concerns the ornamental and protective covering of the outer sides of vehicle wheels.

An object of the invention is to provide a wheel structure having novel cover means on the outer side thereof.

Another object of the invention is to provide a wheel structure having novel means thereon affording simulation of a wire wheel.

A further object of this invention is to provide an improved cover for disposition at the outer side of a vehicle wheel.

Still another object of this invention is to provide a novel wheel cover adapted to afford for the outer side of a disk spider wheel the appearance of it being a wire spoke wheel.

It is a further object of the invention to provide an improved wheel cover embodying a simple and inexpensive arrangement of spoke simulating elements.

Other objects, features and advantages of the present invention will be readily apparent from the following detailed description of several embodiments thereof taken in conjunction with the accompanying drawings in which:

FIGURE 1 is a fragmentary side elevation of a wheel structure;

FIGURE 2 is an enlarged radial cross section of the wheel structure shown in FIGURE 1;

FIGURE 3 is an enlarged fragmentary view of the outer spoked cover member;

FIGURE 4 is an enlarged fragmentary cross section taken substantially on the line IV—IV looking in the direction indicated by the arrows shown in FIGURE 3;

FIGURE 5 is an enlarged fragmentary front view of the inner cover member;

FIGURE 6 is an enlarged fragmentary cross section taken substantially on the line VI—VI looking in the direction indicated by the arrow shown in FIGURE 5;

FIGURE 7 is an enlarged front elevation of a modified cover structure;

FIGURE 8 is an enlarged fragmentary radial section of the cover shown in FIGURE 7 as appearing along the line VIII—VIII;

FIGURE 9 is an enlarged fragmentary front view of still another modified cover structure;

FIGURE 10 is an enlarged fragmentary front view of the outer spoked cover member employed on the cover structure shown in FIGURE 9; and FIGURE 11 is a fragmentary front view of the inner spoked cover member employed on the cover structure shown in FIGURE 9.

The wheels 10 to which the present invention is especially applicable comprises a disk spider body 11 and a multi-flange to drop center type tire rim 12 which is secured at 13 and welded in assembly therewith.

The rim 12 includes an intermediate rim flange 14, a radial rim flange 15, and a terminal rim flange 16. At the junction of the rim flanges 14 and 15 is provided an annular rim shoulder 17. The wheel body 11 is adapted to be bolted on to the axle of the wheel in a conventional manner by passing lugs through the aperture shown at the central part of the body part. Mounted upon the tire rim 14 is a pneumatic tire 18 which may be a tube type tire or a tubeless type tire, as desired. The tire is adapted to be inflated by inserting air into the valve stem 18a as shown in FIGURE 1.

In ornamental and protective relation at the outer side of the wheel is a wheel cover structure 20 which will afford the illusion of the wheel being a wire spoke wheel although the advantages of economy and sturdiness inherent in a disk spider wheel are retained. To this end, the cover structure 20 includes an axially outer circular cover member or plate 21, an inner circular cover member or plate 22, a spinner or spinner member 23, and a retaining ring 24.

The cover members 21 and 22 each comprise a sheet metal stamping and are provided with central cover areas 25 and 26 which are in embottomed engagement together. Annular ribs 27 are spaced axially of one another and extend circularly about the perimeter of the central areas 25 and 26. These ribs 27 and 28 cooperate with the central areas 25 and 26 in providing a deep pressed area and the spinner 23 is mounted therein. The spinner 23 has an annular radial flange 23a and screws 28' extend through the central areas 25 and 26 and are engaged in threaded assembly with the annular spinner flange 23a to hold the central areas 25 and 26 in unitary assembly together and with the spinner flange 23a.

The cover members 21, 22 and 24 are provided with stepped margins 29, 30 and 31 which are engaged in nested assembly together. To this end, the outer cover margin on the cover member 21 has a series of step flanges 29a–f, inclusive. The flanges 29e and f extend over the outer edges of the cover members 22 and 24 and behind the cover members for locking the nested margins 29, 30 and 31 in nested assembly together. The inner cover member has its stepped margin 30 provided with stepped marginal flanges 30a, 30b, and 30c. The ring has its outer margin provided with stepped flanges 31a, 31b, 31c and 31d. The juncture between the stepped flanges 31b and 31c is bottomed against the rim shoulder 17 when the cover is secured on the wheel while the outer margin of the cover structure is spaced from the wheel so that a pry-off tool can be worked between the cover structure and the wheel to disengage a series of resiliently deflectable cover retaining fingers 30e from the intermediate rim flange 14. The fingers 30e have an outside diameter slightly in excess of the inside diameter of the intermediate rim flange 14 so that when the cover structure is pressed to the wheel the fingers 30e are engaged under resilient tension therewith. In order to join the ribs 27 and 28 on the cover members 21 and 22 with the outer cover margins 29 and 30, a series of U-shaped spokes 32 and 33 are provided. The spokes 32 extend generally radially and axially inwardly and are crossed with respect to the radial and axially extending spokes 33. The spokes 32 and 33 are disposed in circumferentially spaced planes and intersect along a line through a central axis of the cover members. It will further be noted the spokes on each cover member 21 and 22 are spaced circumferentially with respect to one another and when the cover members are engaged in assembly together, the spokes on the cover member 21 are circumferentially staggered with respect to the spokes on the cover member 22.

The inner margin of the outer cover margin 29 has a series of V-shaped cut out areas 34 disposed between the spokes 32. When the cover members 21 and 22 are in assembly together, the spokes 33 on the inner cover member 22 are aligned with bottoms 34a of the V-shaped notched cut out areas 34.

A modified type of cover structure is indicated generally at 20' in FIGURE 7. Primed reference numerals have been used to designate parts which correspond to the parts previously described in connection with the first form of my invention. The cover structure 20' differs from the cover structure 20 in that it is provided with an outer margin 29' having a series of cover retaining fingers 40' circumferentially spaced about an inner edge of the cover margin 29'. The cover structure 20' further differs from the cover structure 20 in that spokes 33' are provided with outer ends 33a' which are welded at 49 to the outer cover margins depth 29b' (FIGURE 8). The cover structure 20 may be mounted on a vehicle wheel and removed from a vehicle wheel in the same manner as previously described. The fingers 40 are adapted to coact with an intermediate rim flange for securing the cover structure 20' on the vehicle wheel. The cover structure 20' further differs from the cover structure 20 in that it comprises essentially a three piece structure having screws 28a' for securing the spinner 23' with central areas of the cover members 21 and 22 in the same manner as previously described.

Shown in FIGURES 9–11 is still a third form of my invention with the reference numeral 20'' designating a cover structure. The cover structure 20'' includes cover members 21'' and 22''. The cover structure 20'' is identical to the cover structure 20 except that its spokes 32'' each have a generally X-shape.

It will be understood that modifications and variations may be effected without departing from the scope of the novel concepts of the present invention.

I claim as my invention:
1. In a wheel structure,
a non-wire spoke type wheel and a cover structure having means securing the cover structure in press-on, pry-off assembly with the wheel,
the cover structure comprising a pair of axially inner and axially outer spoke type cover members each comprising a sheet metal stamping and having a series of circumferentially spaced spokes,
the spokes on one of the cover members being staggered circumferentially of the spokes on another of said cover members and with the spokes on the axially outer cover member extending generally radially and axially across and between the spokes on the axially inner cover member creating a wire spoke wheel effect on the wheel, the spokes being disposed in circumferentially spaced planes intersecting along a line through a central axis of said cover members,
the cover structure further including a spinner disposed on the axially outer side of said cover members and screws having heads disposed on the axially inner side of said cover members and with the screws being extended through the central areas of said cover members and threaded into said ornament securing the cover members in bottomed engagement with an axially inner face of said spinner in unitary assembly.

2. In a wheel structure,
a non-wire spoke type wheel and a cover structure having means securing the cover structure in press-on, pry-off assembly with the wheel,
the cover structure comprising a pair of axially inner and axially outer spoke type cover members each comprising a sheet metal stamping and having a series of circumferentially spaced spokes,
the spokes on one of the cover members being staggered circumferentially of the spokes on another of said cover members and with the spokes on the axially outer cover member extending generally radially and axially across and between the spokes on the axially inner cover member creating a wire spoke wheel, the spokes being disposed in circumferentially spaced planes intersecting along a line through a central axis of said cover members, effect on the wheel,
the cover structure further including a spinner disposed on the axially outer side of said cover members and screws having heads disposed on the axially inner side of said cover members and with the screws being extended through the central areas of said cover members and threaded into said ornament securing the cover members in bottomed engagement with an axially inner face of said spinner in unitary assembly.
said means comprising retaining fingers formed formed along on the inner edge of an outer margin of said inner cover member which fingers are disposed radially outwardly of said spokes.

3. In a wheel structure,
a non-wire spoke type wheel and a cover structure having means securing the cover structure in press-on, pry-off assembly with the wheel,
the cover structure comprising a pair of axially inner and axially outer spoke type cover members each comprising a sheet metal stamping and having a series of circumferentially spaced spokes,
the spokes on one of the cover members being staggered circumferentially of the spokes on another of said cover members and with the spokes on the axially outer cover member extending generally radially and axially across and between the spokes on the axially inner cover member creating a wire spoke wheel effect on the wheel, the spokes being disposed in circumferentially spaced planes intersecting along a line through a central axis of said cover members,
the cover structure further including a spinner disposed on the axially outer side of said cover members and screws having heads disposed on the axially inner side of said cover members and with the screws being extending through the central areas of said cover members and threaded into said ornament securing the cover members in bottomed engagement with an axially inner face of said spinner in unitary assembly,
the outer cover member having an outer margin with V-shaped recessed areas disposed between its spokes, the spokes on the inner cover member being radially aligned with the bottoms of the recessed areas on the outer cover member.

4. A vehicle wheel cover structure comprising,
an axially outer spoked cover plate having a first set of circumferentially spaced spokes including a central plate portion and an outer exposed ring portion with the spokes being formed integral at one end with an outer margin of the central plate portion and integral with an axially inner margin of the outer ring portion,
the outer exposed ring portion having circumferentially spaced open sided notches at its inner margin,
an axially inner spoked cover plate having a second set of circumferentially spaced spokes disposed circumferentially between the spokes of said first set and having an inner plate portion and an outer concealed ring portion disposed axially behind said central plate portion and said outer exposed ring portion with said second set of spokes having outer spoke end portions engaged in said notches on said outer exposed ring portion,
the sets of spokes being disposed in axially crisscrossed relation for rigidly supporting the ring portions of the cover plates on the central plate portions,
means mounted on an underside of the cover structure for securing the cover structure in removable assembly with a vehicle wheel, and a spinner mounted on said central plate portion on said axially outer cover plate is assembly therewith.

5. The cover structure of claim 4 further characterized by means extending through said central plate portions on said plates and secured with said spinner for retaining these elements against axial movement with respect to one another and for holding said outer spoke ends on said second set of spokes engaged in said notches.

6. A vehicle wheel cover structure comprising,
an axially outer spoked cover plate having a first set of circumferentially spaced spokes including a central plate portion and an outer exposed ring portion with the spokes being formed integral at one end with an outer margin of the central plate portion and integral with an axially inner margin of the outer ring portion,
    an outer exposed ring portion having circumferentially spaced open sided notches at its inner margin,
an axially inner spoked cover plate having a second set of circumferentially spaced spokes disposed circumferentially between the spokes of said first set and having an inner plate portion and an outer concealed ring portion disposed axially behind said central plate portion and said outer exposed ring portion with said second set of spokes having outer spoke end portions engaged in said notches on said outer exposed ring portion,
    the sets of spokes being disposed in axially crisscrossed relation for rigidly supporting the ring portions of the cover plates on the central plate portions, and
means mounted on an underside of the cover structure for securing the cover structure in removable assembly with a vehicle wheel.

References Cited in the file of this patent
UNITED STATES PATENTS

| | | |
|---|---|---|
| Re. 25,144 | Lyon | Mar. 27, 1962 |
| 2,045,902 | Eksergian | June 30, 1936 |
| 2,709,114 | Plotkin | May 24, 1955 |
| 2,713,514 | Lyon | July 19, 1955 |
| 2,725,257 | Maurer et al. | Nov. 29, 1955 |

FOREIGN PATENTS

| | | |
|---|---|---|
| 532,673 | Italy | Aug. 29, 1955 |

UNITED STATES PATENT OFFICE
CERTIFICATE OF CORRECTION

Patent No. 3,145,059                              August 18, 1964

Edward G. Hemstreet

It is hereby certified that error appears in the above numbered patent requiring correction and that the said Letters Patent should read as corrected below.

Column 1, line 67, after "part" insert -- 11 --; column 3, line 69, after "wheel" insert -- effect on the wheel --; lines 72 and 73, strike out "effect on the wheel,"; column 4, line 9, strike out "formed"; line 37, for "extending" read -- extended --; same column 4, line 74, for "is" read -- in --.

Signed and sealed this 19th day of April 1966.

(SEAL)
Attest:

ERNEST W. SWIDER
Attesting Officer

EDWARD J. BRENNER
Commissioner of Patents